May 16, 1944. P. S. JACKSON 2,349,171
MACHINE TOOL
Original Filed Aug. 3, 1940 2 Sheets-Sheet 2

Inventor:
Paul S. Jackson
By: [signature]
his Attorney

Patented May 16, 1944

2,349,171

UNITED STATES PATENT OFFICE 2,349,171

MACHINE TOOL

Paul S. Jackson, Rockford, Ill., assignor to Rockford Machine Tool Company, Rockford, Ill., a corporation of Illinois Original application August 3, 1940, Serial No. 350,996. Divided and this application June 13, 1941, Serial No. 397,849

6 Claims. (Cl. 90—24.3)

More particularly the invention relates to a machine having control means including a template controlled or tracer valve. This application is a division of my prior application Serial No. 350,996, filed August 3, 1940.

It is a general object of the invention to provide a new and improved template controlled machine.

Another object is to provide such a template controlled machine with a tool head and means operable at the end of the cutting stroke of the tool to cause the tool to be moved at right angles to its cutting stroke and away from the work so as to clear it from the chips during the return stroke.

Other objects and advantages will become apparent from the following description taken in connection with the accompanying drawings, in which:

Fig. 5 is a transverse sectional view of the sleeve and cylinder only of the valve, taken approximately along the line 5—5 of Figs. 2 and 4.

Fig. 6 is a view similar to Fig. 5, but taken along the line 6—6 of Figs. 2 and 4.

Figure 1:
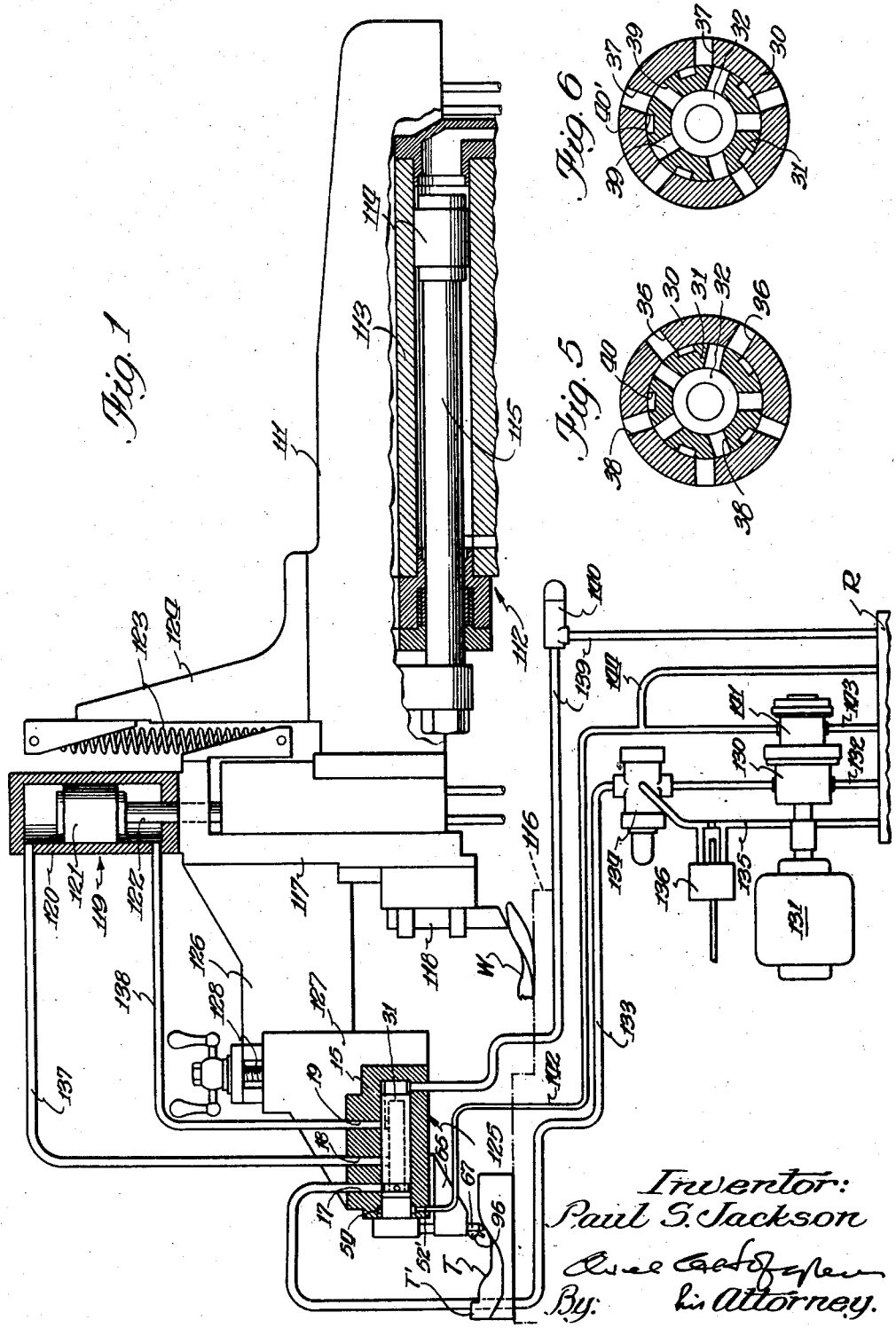
Fig. 1 is a diagrammatic view of a hydraulic circuit embodying the features of this invention.

For purpose of disclosure, the invention is here shown and will hereinafter be described as applied to a shaper of the kind fully disclosed and claimed in my United States Letters Patent No. 2,223,038 issued November 26, 1940. Such a shaper has a horizontally disposed, longitudinally reciprocable tool carrying slide or ram 111 driven by a hydraulic motor 112 of the reciprocatory type comprising a cylinder 113 fixed in the bed or frame of the shaper, and a piston 114 whose connecting rod 115 projects through the forward end of the cylinder 113 and is secured at its projecting end to the slide 111. Through a suitable hydraulic circuit including a pressure generating pump and control valves all fully disclosed in my above mentioned patent, the slide 111 is continuously reciprocated, once operation of the shaper is initiated, to move through a forward or cutting stroke and a return stroke repeatedly.

Disposed at the front of the shaper and beneath the slide 111 is a table 116 which, in the present instance, constitutes a support for both a template T and a work blank W which is to be machined to conform to the template T. This table is indexable transversely of the shaper so as to present a new portion of the work to the tool after each cutting stroke of the slide 111. Such indexing of the table is effected automatically to take place after the completion of one cutting stroke and before the commencement of the new cutting stroke, all as described in my above mentioned patent.

Mounted on the forward end of the slide 111 is a tool slide 117 adapted to carry a cutting tool 118. In the preesnt instance, this tool slide is mounted for vertical movement and is adapted to be moved through the medium of a hydraulic motor 119 of the reciprocatory type comprising a cylinder 120 rigid with the slide 117 and a piston 121 having the projecting end of its piston rod 122 fixed in the main slide 111. Serving partially to counter-balance the weight of the slide 117 is a tension spring 123 secured at one end to the slide 117, and secured at the other end to an upwardly extending bracket 124 of the slide 111.

Operating fluid is supplied to the motor 119 by a hydraulic circuit which includes a duplicator or tracer valve 125. This valve is mounted to partake of the same movement as the tool slide 117 and to that end the slide 117 has a forwardly projecting extension 126 supporting on its free end a slide 127 in which the valve 125 is carried. In order that the valve 125 may be adjusted relative to the tool 118, the slide 127 is vertically movable and may be adjusted through a conventional adjusting screw 128. While the valve 125 is fully disclosed and claimed in my copending applications Serial Nos. 350,995 and 350,996 filed August 3, 1940, the valve herein will be described in detail in order to render more readily understandable certain features of this invention.

The valve 125 comprises an elongated housing composed in the main by a generally cylindrical casing 15 having extending longitudinally thereof a bore 16 opening through opposite ends. Opening through the sides of the casing 15 are a plurality of ports 17, 18 and 19. The first of these ports, namely, 17, communicates with the bore in the casing 15 through a shallow and comparatively narrow annular groove 20 and constitutes the intake port through which fluid under pressure is supplied to the valve. Ports 18 and 19 communicate with the bore 16, respectively, through shallow and very wide annular grooves 21 and 22, and these ports serve alternately as supply or return ports for the reversible hydraulic motor 119. Secured to the casing 15, as by bolts 23, is a block 24 having formed therein threaded recesses 25, 26 and 27 which register, respectively, with the ports 17, 18 and 19 and constitute means for the attachment of conduits to the valve.

Within the bore of the casing 15 is an annular sleeve 30 and within the sleeve 30 is a valve cylinder 31 having a passage 32 extending longitudinally thereof. At the end opposite the port 17, the valve cylinder 31 is formed with an external annular groove 33 which communicates with the passage 32 through a plurality of radial ports 34 and which registers with a plurality of radial ports 35 formed in the sleeve 30 so as to communicate with the intake port 17. The remainder of each the sleeve 30 and the cylinder 31 is given over to ports governing the flow of fluid from the passage 32 within the valve cylinder to the ports 18 and 19.

In order to attain certain advantages which will presently become more apparent, and in order that the valve may act as a reversing valve, the sleeve 30 is formed with a first set of ports taking the form of a plurality of parallel elongated slots 36 cut completely through the sleeve. These slots spiral about the sleeve to form helical ports and are spaced uniformly about the sleeve. A second set of ports is composed of similar slots 37 which, however, spiral in the opposite direction and, moreover, are offset angularly the appropriate amount necessary to make the valve function as a reversing valve, herein about one-tenth revolution. A plurality of such slots 36 and 37 are employed so as to increase the volume of fluid which may flow through the valve.

Correspondingly, the valve cylinder 31 has a first and a second set of ports taking the form of parallel, elongated slots 38 and 39, respectively, cut completely through the cylinder to communicate with passage 32 and thus constitute supply or pressure ports. The slots 38 and 39 are also helical and extend generally parallel with their cooperating slots 36 and 37 formed in the sleeve 30, that is, slots 38 and 39 spiral in opposite directions about the valve. Milled in the outer surface of the cylinder 30 between the slots 38 are a plurality of grooves 40 extending parallel with the slots 38 and between the slots 39 are grooves 40' extending parallel with the slots 39. Unlike the slots 38 and 39, which are independent of one another, the grooves 40 and 40' join at their inner ends to form a continuous groove, and grooves 40 moreover open through the end of the cylinder 31 to discharge to an exhaust chamber 41 formed in the major part by a cup-shaped member 42. This member is secured over the end of the casing 15 by bolts 43 to close the same. Opening through the side of the member 42 is a port 44 threaded for the reception of a suitable fluid exhaust or return conduit.

Figure 4:
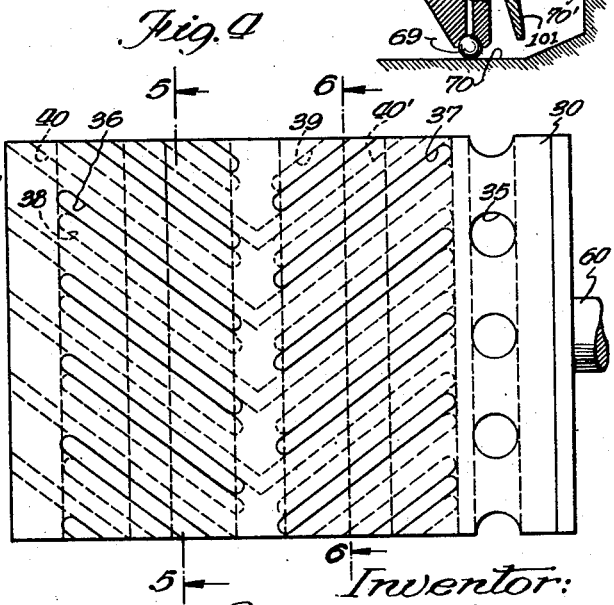
Fig. 4 is a development better to show the ports of the valve of Fig. 2.

As can be readily understood from the foregoing description, and as can easily be seen from a consideration of Figs. 4, 5, and 6, the valve has a neutral or closed position in which none of the slots 36 or 37 registers with any of the slots 38 and 39 on the grooves 40 and 41'. No flow of fluid, therefore, can take place. With relative rotation between the sleeve 30 and the cylinder 31, however, the ports 36 and 37 are brought into registry with the ports in the cylinder. With relative rotation in one direction, the ports 36 register with slots 38 so that pressure fluid is supplied to port 19 while ports 37 register with grooves 40' to take care of fluid returning through port 18. Conversely, upon relative rotation in the opposite direction, port 18 becomes a supply or discharge port, while 19 becomes a return port.

To obtain maximum rates of port opening and closing, both the sleeve 30 and the cylinder 31 are rotatable. In order that both may be independently actuated from a point externally of the valve casing, the sleeve 30 has bolted to one end thereof an annular member 47 having a hub portion 48 received in the sleeve, and a radially outwardly projecting flange 49. The flange 49 provides a convenient area through which bolts 50 securing the member to the sleeve may be passed and also extends radially outwardly beyond the sleeve 30 to engage a shoulder 51 formed in the end of the casing 15. Surrounding the member 47 is an annular ring 52 which is bolted to the casing 15 and bears against the flange 49 to retain the sleeve against endwise movement. An inturned flange 53 on the ring forms with the member 47 an annular space 54 for trapping leakage fluid. Opening through the ring 52 is a port 52' (see Fig. 1) adapted for the attachment of a suction conduit for the removal of trapped leakage fluid. Outwardly of the member 47 is a lever 55 having an annular hub portion 56 bolted to the member 47 to complete the actuating means for the sleeve 30.

The cylinder 31 has a shaft-like extension 59 which projects rotatably through the member 47 and the hub 56 of the lever 55. At its projecting end the extension is splined to receive non-rotatably a lever 60 by which the cylinder is rotated. The lever 60 is retained against movement off the end of the extension by a set screw 61.

Since the valve is particularly adapted for and is herein shown governing the hydraulic circuit of a pattern controlled machine, it includes tracer means for effecting the rotation of the sleeve 30 and the cylinder 31. Depending from the valve casing 15 is a bracket 65 having a bore 66 therein in which is reciprocably mounted a tracer finger 67. The tracer finger 67 is adapted to project at both ends from the bore and at its outer end has an enlarged head 68 which terminates in a point the very tip of which is preferably formed by a ball 69 of hardened material, which ball forms the point of contact with a master template T, the contour of which is to be reproduced. The tracer finger 67 is urged outwardly so as to maintain its contact with the template T by a compression spring 71 which encircles the finger and bears at one end against an annular shoulder formed by the head 68, and at the other end bears against an annular shoulder formed in the bracket 65 by a reduction in the diameter of the bore 66.

Figure 3:
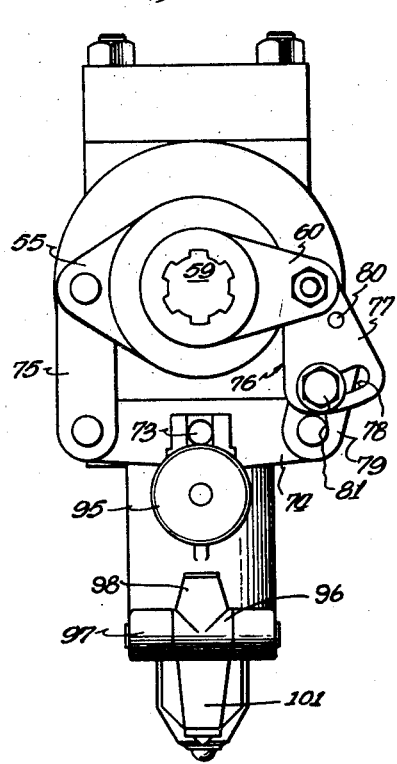
Fig. 3 is an end elevational view of the valve of Fig. 2 taken from the right in that figure.

At its inner end, the finger 67 is bifurcated, and received between the bifurcations 72 and retained therebetween by a pin 73 is a bar 74 extending transversely of the valve. One end of the bar is connected by a link 75 to the lever 55 rigid with the sleeve 30, while the other end of the bar 74 is connected by suitable linkage, generally designated 76, to the lever 60 which is non-rotatably mounted on the extension 59 of the cylinder 31. It will be seen, therefore, that with the slightest movement of the tracer finger 67 both the sleeve 30 and the cylinder 31 will be rotated and will, moreover, be rotated in opposite directions so as to result in a port opening at twice the rate that would be effected by the rotation of either the cylinder or the sleeve alone. Thus, should the template T cause the finger 67 to move upwardly from a neutral position in which it is shown, the lever 55 would be rotated in a clockwise direction, as viewed in Fig. 3, while the lever 60 would be rotated in a counter-clockwise direction. Such rotation of the levers would, of course, impart like rotation to the sleeve 30 and the cylinder 31 which, as best seen in Figs. 5 and 6, would cause the ports 36 in the sleeve to register with the return grooves 40 in the cylinder, making of the port 19 a return port, while the ports 37 in the other half of the sleeve (see Fig. 6) would register with the grooves 39, making of the port 18 a pressure or supply port. As will presently be seen, when 18 is a pressure port, fluid is supplied to the hydraulic motor 119 in such direction as to cause the tool to be raised an amount corresponding to the movement of the tracer finger 67. It is to be understood, of course, that with the valve mounted to move with the tool that at the time the tool is raised a proper amount the tracer finger will again be in neutral position and the sleeve and the cylinder will have returned to the position shown in Figs. 5 and 6, cutting off the supply of operating fluid. Conversely, should the tracer finger 67 drop from its neutral position, the levers 55 and 60 would be rotated in a counter-clockwise and clockwise direction, respectively, and the sleeve and the cylinder would be given a corresponding rotation. Under those conditions, the ports 36 in the sleeve would register with the grooves 38 in the cylinder, making of the port 19 a pressure port, while the ports 37 in the other half of the sleeve would register with the grooves 40' to make of the port 18 a return port.

The valve herein is provided with certain adjustments which, in conjunction with the helical character of the ports, serves to permit such setting of the valve as will aid in counter-balancing the mechanism controlled thereby, and for other proper setting and operation of the mechanism. To that end, the linkage 76 is made adjustable and comprises a somewhat triangular shaped link 77 which is pivotally connected at its apex to the lever 60 and near its base is formed with an arcuate slot 78. Cooperating with the link 77 is a link 79 pivotally connected at one end to an end of the bar 74, and pivotally connected at its other end through the medium of a pin 80 to the link 77 near its point of connection to the lever 60 and to one side of the center line of the link. Carried by the link 79 and projecting through the slot 78 is a bolt 81 which may be loosened to permit swinging of the links relative to one another and thereafter tightened to retain the links in adjusted position. This adjustment makes possible a variation in the counter-balancing effect on the tool actuating motor 119 of the fluid flowing through the valve. Thus, with port 18 leading to that end of the hydraulic motor which serves to support or raise the tool, the valve may be appropriately adjusted to effect an increasing or decreasing counter-balancing effect. This is best understood from a consideration of Fig. 4. For any given setting of the tracer finger 67, if the linkage 76 is adjusted so as to increase its effective length, the lever 60 and hence the cylinder will be rotated in a counter-clockwise direction, as viewed in Fig. 3, which is downwardly, as viewed in the development (Fig. 4). With such downward movement of the cylinder, the pressure ports 39 will be moved toward the ports 37 in the sleeve, while the pressure ports 38 in the left half of the cylinder will be moved away from the ports 36. Thus it will be seen that, for any given movement of the tracer finger 67 above or below its normal position, the ports 37 and 39 will come into registry sooner or have a greater registry, if indeed they are not in registry when the tracer finger is in its neutral position, with an up movement of the finger than the ports 36 and 38 for a corresponding downward movement of the finger.

Means is also provided for adjusting the cylinder longitudinally relative to the sleeve 30. To that end, the cup-shaped member 42 has formed therein a threaded bore 83 in the bottom thereof in which is threadedly received a plug 84. The cylinder 31 has a reduced rod-like extension 85 which passes through and by means of which the cylinder is secured to the plug 84. In order that the cylinder, though attached to the plug, may be freely rotatable, there is interposed between the cylinder and the plug a ball bearing 86 and a similar ball bearing 87 is interposed between the plug and a nut 88 threaded onto the extension 85, and by means of which the cylinder is secured to the plug 84 to partake of the axial movement of the plug. A lock nut 89 secures the plug in adjusted position, and the adjusting mechanism is protected against injury and accidental shifting by a cap 90 threaded onto a hub-like flange 91 projecting outwardly from the member 42. It will be apparent that by rotation of the plug 84 the cylinder 31 will be moved axially relative to the sleeve 30. As best seen from the development of Fig. 4, such axial shifting of the cylinder relative to the sleeve for any given setting of the valve and tracer finger will cause a greater or lesser overlap between the ports in the sleeve and either both pressure ports in the cylinder or both return grooves, depending upon in which direction the shift is made.

Figure 2:
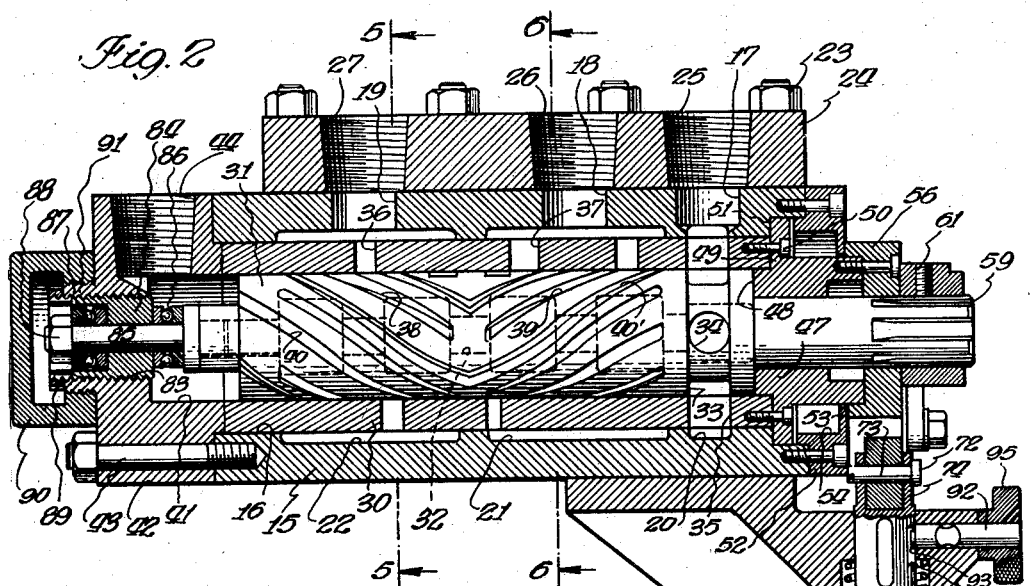
Fig. 2 is a vertical diametrical sectional view of the tracer or duplicator valve embodied in the circuit of Fig. 1.

Means is provided for manually raising and holding the tracer finger 67 above its neutral position, so as to cause the valve to remain in an open position. To that end, there is rotatably journaled in the bracket 65 a shaft 92. This shaft at its inner end carries an eccentrically mounted nub 93 which projects into the reduced portion of the bore 66 and into a slot 94 formed in the tracer finger 67. At its outer end the shaft 92 carries a knurled hand knob 95. Normally the shaft is rotated to the position shown in Fig. 2, in which the nub 93 merely serves as a limit for the movements, particularly the outward movement of the tracer finger 67. When rotated through 180°, however, the nub 93 shifts the tracer finger inwardly and holds the same there, thereby rotating the sleeve 30 in a clockwise direction, as viewed in Fig. 6, and the cylinder 31 in a counter-clockwise direction, causing a registration of ports 37 and 39. Pressure fluid is thus supplied to the port 18 until the shaft 92 is manually rotated to restore the tracer finger to normal, freely operative position.

Means is also provided for automatically raising and holding the tracer finger 67 above its neutral position for a limited time. This means takes the form of a crank 96 pivotally mounted between ears 97 formed on the bracket 65 and having a first leg 98 adapted to abut the bracket 65 to limit the counterclockwise rotation of the crank, and a second leg 99 which projects into a notch 100 cut in the tracer finger 67. Projecting downwardly and outwardly from the end of the leg 99 is a finger 101 which, upon striking an abutment on the template such as indicated at T' during the movement of the tracer finger across the template, will pivot the crank in a clockwise direction as viewed in Fig. 2, and as a result will raise the tracer finger 67. Such raising of the tracer finger will, of course, rotate the sleeve and cylinder of the valve to open the ports therein. Herein the valve is so connected that raising of the tracer finger will cause a like raising movement of the tool. Hence the abutment T' on the template is normally so positioned that it will be struck by the finger 101 at the end of the cutting stroke of the tool and frequently when the tool comes to a hub or the like, so that it will be raised to clear itself from the chips cut by it. Occurring at the end of the stroke, the crank is, of course, pivoted until a reversal takes place, after which time the tracer finger again is freed to the control of the template proper. In addition to clearing the tool from the chips which it has cut, this construction has the advantage that it raises the tool out of contact with the work during the return stroke.

In addition to the tracer valve 125, the hydraulic circuit comprises a main pressure pump 130 driven from an electric motor 131. The pump 130 draws fluid from a tank or reservoir R through a conduit 132 and discharges the pressure fluid through a conduit 133 which leads to the intake port 17 of the valve 125. Interposed in the conduit 133 is a relief valve 134 which has leading therefrom a by-pass return conduit 135 through which excess fluid is returned to the reservoir when the pressure in the conduit 133 exceeds a predetermined value. A cooler 136 may be connected to the conduit 135 in conventional manner to cool the fluid.

Valve 125 has its port 18 connected to the head end of the tool slide actuating motor 119 by a conduit 137, while the rod end of the motor 119 is connected by a conduit 138 with the port 19 of the valve. It is to be noted in this connection that the motor 119 is so arranged that the larger pressure area of the piston 121 serves to effect a raising of the slide 117 so that the pressure differential between the head and rod ends of the motor may be utilized to aid in counter-balancing the weight of the slide 117 and the parts carried thereby. Exhaust fluid is returned from the valve to the reservoir R through a conduit 139 connected at one end to the port 44 and discharging at the other end to the reservoir R. Preferably interposed in this return conduit is a back pressure valve 140.

Also driven from the motor 131 is an auxiliary pump 141 which is a small suction pump. This pump has connected to its intake side a conduit 142 which is connected to the port 52' of the valve 125 for the purpose not only of withdrawing leakage fluid trapped in the chamber 54, but for actually maintaining slight suction in the chamber so as to preclude all possibility of a building up of pressure within the valve by leakage fluid. A conduit 143 leads from the discharge side of the pump 141 to the reservoir R. In order to maintain the suction of the pump 141, a conduit 144 is connected at one end to the conduit 142 and at the other end is connected with the reservoir so that fluid may be continuously circulated through the pump 141.

In the operation of the machine to which the circuit is applied, a work blank W is first mounted on the table 116 and to the tool 118 adjusted relative to the neutral setting of the tracer finger 67, so as to produce the desired depth of cut. The machine is then started and the slide 111 will move through a forward or cutting stroke. During such forward or cutting stroke, the tracer finger 67, of course, traverses the template T, while at the same time the tool 118 traverses the work W. With a template of the contour here shown, the tracer finger 67 will initially move below its normal position and accordingly will rotate the sleeve 30 in a counter-clockwise direction and the cylinder 31 in a clockwise direction, as viewed in Figs. 5 and 6, thereby causing ports 38 in the sleeve to register with the pressure ports 36 in the cylinder and ports 37 of the sleeve to register with return ports 40' in the cylinder. Consequently, port 19 becomes a pressure port and fluid is supplied to the rod end of the cylinder 120, while 18 is a return port through which fluid is discharged from the head end of the cylinder. The tool slide 117, therefore, moves downwardly carrying with it the valve 125 until the tracer finger 67 again is returned to neutral or normal position in which the valve 125 is closed arresting the further supply of fluid to the motor 119. When the tracer finger 67 strikes a point in the template raising it above its neutral or normal position, the sleeve and the cylinder 31 of the valve are rotated in the opposite directions, namely, clockwise and counter-clockwise, respectively, as viewed in Figs. 5 and 6. With rotation in those directions, the ports in the sleeve and the valve cylinder are caused to register in a reverse manner, thereby making of the port 18 a pressure port, while the port 19 becomes a return port and fluid is thus supplied to the head end of the cylinder 120 so as to raise the tool slide and the valve until the tracer finger again reaches its normal or neutral position. It is to be understood, of course, that whatever the contour of the template, the valve 125 will so control the supply of fluid to the motor 119 as to cause the tool 118 to take a cut corresponding to the contour of the template.

At the end of the cutting stroke the finger 101 of the crank 96 strikes the abutment T' of the template, and in so doing shifts the tracer finger upwardly and thus rotates the valve in such manner as to cause fluid to be supplied to the head end of the motor 119. This raises the tool slide 117 and thus permits it to clear itself from the chips which it has cut, and this control and resultant movement of the tool slide is particularly advantageous when the cut of the tool terminates up against a hub or like structure. The tracer finger, of course, remains shifted until the finger 101 is withdrawn from engagement with the abutment T' as an incident to the return movement of the slide 111. During the return stroke of the slide 111 and after the finger 101 has been freed from engagement with the abutment T', the tool slide 117 floats down to a more or less normal position preparatory to commencement of a successive cutting stroke. Thus the raising of the tool slide at the end of the cutting stroke has the additional advantage of lifting the tool off of the work during the return stroke of the tool.

Should it be found, during the operation of the machine, that the tool slide 117 and the other parts carried thereby is not quite properly counter-balanced by the spring 123, this may be compensated for by an adjustment of the linkage 76 of the valve. Thus should the counter-balancing effect of the spring 123 be insufficient the linkage 76 may be lengthened so that for a given setting of the tracer finger 67 the cylinder 31 will have a position slightly counter-clockwise, as viewed in Figs. 5 and 6, of its normal position. Such adjustment, as will readily be seen from Figs. 4 to 6, brings the pressure ports 39 and the ports 37 closer together, while the pressure ports 38 and the ports 36 are separated, and since the ports 37 lead to the port 18 connected to the head end of the cylinder 120, it will be seen that this adjustment will tend to cause the fluid supplied to the motor 119 to have a greater lifting effect on the slide 117. Conversely, by shortening the linkage 76 the counter-balancing effect of the fluid can be made less. Also, should the slide 117 be somewhat sluggish in its response to shift of the tracer finger 67, this may be corrected by adjusting the cylinder 31 axially relative to the sleeve 30, thereby varying the overlap of the ports.

I claim as my invention:

1. In a template controlled machine, a template, a work support, a reciprocable main slide, means for driving said slide through a cutting and a return stroke relative to said template and to said work support, a tool slide mounted on said main slide for movement transversely thereof, a hydraulic motor for actuating said tool slide, a tracer mechanism mounted on said tool slide and having a tracer finger adapted to ride on the template and a valve controlled by said finger, a hydraulic circuit including said motor and said valve, and means carried by said tracer mechanism operable upon engagement with an abutment at the end of the cutting stroke to move said tracer finger out of engagement with the template to effect a corresponding movement of the tool slide.

2. In a template controlled machine, a reciprocable main slide, means for driving said slide through a cutting and a return stroke, a tool slide mounted on said main slide for movement transversely thereof, a hydraulic motor for actuating said tool slide, a tracer valve mounted on said tool slide and having a tracer finger adapted to ride on the template, a hydraulic circuit including said motor and said valve, and means operable upon engagement with an abutment on the template at the end of the cutting stroke to raise said tracer finger out of engagement with the template to effect a like raising of the tool slide, said means comprising a crank pivoted on the valve casing and having a leg disposed to engage and shift said tracer finger away from the template when said crank is rocked, and a finger on said crank projecting laterally of said tracer finger to rock said crank upon engagement with an abutment on the template.

3. In a template controlled machine, a support for a template and for a work piece, a reciprocable main slide, means for driving said slide through a cutting and a return stroke relatively to said support, a tool slide mounted for movement transversely thereof, a hydraulic motor for actuating said tool slide, a tracer valve mounted on said tool slide and having a tracer finger adapted to ride on the template, a hydraulic circuit including said motor and said valve, and means operable upon engagement with an abutment at the end of the cutting stroke to move said tracer finger out of engagement with the template to effect a like movement of the tool slide away from the main slide, said means comprising a crank pivoted on the valve casing and having a leg disposed to engage and shift said tracer finger away from the template when said crank is rocked, and a finger on said crank projecting laterally of said tracer finger to rock said crank upon engagement with an abutment.

4. In a template controlled machine, a template, a work support, a reciprocable main slide, means for driving said slide through a cutting and a return stroke relative to said work support and said template, a tool slide mounted for movement transversely of said main slide, a hydraulic motor for actuating said tool slide, a tracer valve mounted on said tool slide and having a tracer finger adapted to ride on said template, a hydraulic circuit including said motor and said valve, and means operable upon engagement with an abutment at the end of the cutting stroke to move said tracer finger out of engagement with the template to effect a like movement of the tool slide transversely of the main slide to carry a tool on the tool slide out of engagement with a work piece on said support during the return stroke of said main slide.

5. In a template controlled machine, a work support having a template thereon, a tool support mounted for movement relatively to the work support, a hydraulic motor for actuating said tool support, a tracer valve mounted on said tool support and having a tracer finger adapted to ride on the template, a hydraulic circuit including said motor and said valve, and means operable upon engagement with an abutment on the template at the end of a cutting operation to move said tracer finger away from the template to effect a like movement of a tool on the tool support away from the work on the work support.

6. In a template controlled machine, a support for a template and for a work piece, a reciprocable main slide, means for driving said slide through a cutting and a return stroke relatively to said work support, a tool support on said main slide, a hydraulic motor for actuating one of said work and said tool supports to effect relative movement toward one another, a tracer mechanism movable with said tool support and having a tracer finger adapted to ride on the template and a valve controlled by said finger, a hydraulic circuit including said motor and said valve, and a member carried by said tracer mechanism operable upon engagement with an abutment at the end of the cutting stroke of said slide to engage and move said tracer finger out of engagement with the template to effect a corresponding movement of the tool support.

PAUL S. JACKSON.